UNITED STATES PATENT OFFICE.

ADOLPH SOMMER, OF BERKELEY, CALIFORNIA.

PROCESS OF MAKING NEUTRAL COMPOUNDS OF CHLORIDE OF SULPHUR.

SPECIFICATION forming part of Letters Patent No. 389,020, dated September 4, 1888.

Application filed February 14, 1887. Serial No. 227,575. (No specimens.)

*To all whom it may concern:*

Be it known that I, ADOLPH SOMMER, a citizen of the United States, residing at Berkeley, in the county of Alameda and State of California, have invented a new and useful Process of Making Neutral Compounds of Fats and Fatty Oils with Chloride of Sulphur; and I do hereby declare that the following is a full and exact description of the process, which will enable others skilled in chemical manipulations to apply the same.

When fats and fatty oils are mixed with chloride of sulphur, there is formed during the reaction a small amount of chlorhydric acid, which, if left in the finished compound, has an injurious effect upon the same, darkening it gradually, and causing its texture to become short, as though it were burned. This deterioration is checked best by removing the chlorhydric acid as soon as it is formed, and for this purpose I add to the fat or oil after it has been purified or otherwise prepared, but before it has been mixed with chloride of sulphur, a small amount of an oxide or hydrate of some metal of the alkaline earths or of the magnesium group, in the form of a very fine powder. The substance which I prefer, on account of its cheapness and availability, is dry calcium hydrate in the form of air-slaked lime; but the oxide of calcium, as well as the oxide and the carbonate of magnesium, if reduced to a very fine powder, will answer the same purpose.

In order to make the air-slaked lime suitable for this purpose, I sift it through a sieve or a bolting cloth, rejecting all coarser particles. The sifted or bolted lime is then mixed with the prepared fat or oil by either stirring it into the whole bulk, or, preferably, by mixing it intimately with a portion and adding this mixture to the remainder of the fat or oil. After the lime has been well disseminated throughout the mass of the fat or oil, the whole is brought to the proper temperature, which according to the nature of the fat or oil may be low or somewhat elevated and the chloride of sulphur added in the manner as described in applications bearing the Serial Nos. 209,637, filed July 31, 1886, and 227,576, filed February 14, 1887. The amount of lime which is necessary for this purpose differs with different fats and oils, and depends also upon the degree of fineness to which it has been reduced. The amount is, however, in all cases much greater than would be theoretically sufficient to neutralize the chlorhydric acid which is formed in the absence of the lime, being with a powder that has been passed through a bolting cloth, about six times the equivalent of this chlorhydric acid.

That the compounds of calcium and magnesium herein mentioned have the property of combining with and removing free acids is well known to chemists; but the method of using them as neutralizing agents consisted heretofore in adding them to substances in which an acid already existed, or in washing substances containing acids in solutions of them, in either event permitting the retention of at least a small amount of acid, and particularly in the last-named process preventing the entire removal of the acid unless the substance (if a solid or semi-solid one) is reduced to an extremely minute form. By my process, however, as the neutralizing agent is so intimately mixed with one of the elements going to form the compound the acid is removed or neutralized as fast as formed. Furthermore, the addition of these compounds to fats and oils would generally be considered injudicious, because of their tendency to saponify the fatty substances, and they have for this reason never been employed for removing mineral acids from ordinary fats and fatty oils; but I find that in the preparation of neutral compounds of chloride of sulphur with fatty bodies it is advantageous, for the reasons previously stated, to reverse the order of adding these neutralizing agents, and that their employment for this purpose does not with the majority of such compounds produce any objectionable results.

Having thus described my invention, what I claim as new, and desire to secure by Letters Patent, is—

The process of making neutral compounds of fats and fatty oils with chloride of sulphur, consisting in adding dry calcium hydrate or some analogous substance to the fat or oil previous to the admixture of the chloride of sulphur, all substantially as described.

ADOLPH SOMMER.

Witnesses:
HERMAN ROYER,
JOHN C. RUED.